(12) United States Patent
Ehrenberg

(10) Patent No.: US 7,815,705 B2
(45) Date of Patent: Oct. 19, 2010

(54) AIR FILTER WITH COMPOSITE END CAP

(75) Inventor: Brian T. Ehrenberg, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 1151 days.

(21) Appl. No.: 11/254,048

(22) Filed: Oct. 19, 2005

(65) Prior Publication Data

US 2007/0084170 A1   Apr. 19, 2007

(51) Int. Cl.
*B01D 39/00* (2006.01)
(52) U.S. Cl. .............. 55/502; 55/498; 55/428; 55/510
(58) Field of Classification Search ........... 55/502, 55/498, 428, 423, 466, 476, 510; 95/273; 96/189; 264/267, 268
See application file for complete search history.

(56) References Cited

U.S. PATENT DOCUMENTS

| | | | |
|---|---|---|---|
| 2,771,156 | A | 11/1956 | Kasten et al. |
| 3,235,633 | A | 2/1966 | Holloway et al. |
| 4,349,363 | A | 9/1982 | Patel et al. |
| 4,720,292 | A | 1/1988 | Engel et al. |
| 4,737,173 | A * | 4/1988 | Kudirka et al. ........ 96/131 |
| 5,190,651 | A | 3/1993 | Spencer et al. |
| 5,484,466 | A | 1/1996 | Brown et al. |
| 5,613,992 | A | 3/1997 | Engel |
| 5,690,712 | A | 11/1997 | Engel |
| 5,730,766 | A | 3/1998 | Clements |
| 5,897,676 | A * | 4/1999 | Engel et al. ............ 55/498 |
| 5,938,804 | A | 8/1999 | Engel et al. |
| 6,004,366 | A | 12/1999 | Engel et al. |
| 6,258,145 | B1 | 7/2001 | Engel et al. |
| 6,322,602 | B2 | 11/2001 | Engel et al. |

(Continued)

FOREIGN PATENT DOCUMENTS

DE    195 21 898 A1    12/1996

(Continued)

OTHER PUBLICATIONS

U.S. Appl. No. 11/253,965, filed Oct. 19, 2005, Ehrenberg.

(Continued)

*Primary Examiner*—Michael A Marcheschi
*Assistant Examiner*—Karla Hawkins
(74) *Attorney, Agent, or Firm*—Leydig, Voit & Mayer, Ltd.

(57) ABSTRACT

The air filter element may include an inner metal liner, an outer metal liner, a filter media, an annular end cap, and a composite end cap. The annular end cap is formed over the metal liners such that the metal liners are secured and at least a portion of the filter media is sealed. The composite end cap has a foamed urethane portion and a rigid urethane portion. The foamed urethane portion, which has a central aperture and stand-off apertures, is molded about the central aperture and the stand-off apertures such that the metal liners are secured, at least a portion of the filter media is sealed, and urethane flashing occurs proximate one or more of the central aperture and an outer liner periphery. The rigid urethane portion is molded over the foamed urethane portion such that the stand-off apertures are filled, blocked, and/or sealed.

21 Claims, 6 Drawing Sheets

U.S. PATENT DOCUMENTS

| | | |
|---|---|---|
| 6,413,289 B2 | 7/2002 | Engel et al. |
| 6,447,567 B1 | 9/2002 | Ehrenberg |
| 6,521,009 B2 | 2/2003 | Engel et al. |
| 2002/0162309 A1 | 11/2002 | Schmitz et al. |
| 2004/0065602 A1 | 4/2004 | Moscaritolo et al. |

FOREIGN PATENT DOCUMENTS

| | | |
|---|---|---|
| DE | 198 47 998 A1 | 4/2000 |
| FR | 2261041 | 9/1975 |
| FR | 2268551 | 11/1975 |
| GB | 808476 | 2/1959 |
| GB | 1499922 | 2/1978 |
| JP | 59-020819 | 2/1984 |
| JP | 59-141150 | 9/1984 |

OTHER PUBLICATIONS

*Nelson Industries* v. *Donaldson Co.*, Case No. 93-C-368-S, Oct. 24, 1994, Amended Judgment in a Civil Case, 20 pages.

Sears Craftsman, Owner's Manual 20" Power-Propelled Lawn Mower, Model No. 917.372100, Aug. 20, 1984, pp. 1-24.

Sears Craftsman, Engine Owner's Manual, Model No. 143.354212, Feb. 1, 1985, 11 pages.

3 pages of drawings of Sears Craftsman filter, available before Oct. 19, 2005.

4 pages of photographs of Sears Craftsman filter, available before Oct. 19, 2005.

\* cited by examiner

AIR FILTER WITH COMPOSITE END CAP

FIELD OF THE INVENTION

The present invention relates to an apparatus for filtering impurities out of a fluid, and more particularly to an apparatus for filtering impurities out of air flowing through an internal combustion engine.

BACKGROUND OF THE INVENTION

A conventional air filtration system, such as those used in over-the-road trucks and in agricultural, automotive, and off-highway equipment, is employed to prevent dirt and dust from entering the engine with the incoming air supply. These conventional air filtration systems may include, among other things, a housing, an air flow tube associated with the housing, and a removable and replaceable air filter element. Air filter elements may include an inner metal liner, an outer metal liner, a filter media, and a pair of end caps. The filter media is disposed between the metal liners. The end caps generally secure the metal liners on opposing sides of the filter element and seal all or a portion of the filter media. It is known to use metal and polymeric end caps as indicated generally by U.S. Pat. No. 6,413,289 entitled "Reverse Flow Air Filter Arrangement" and U.S. Pat. No. 5,484,466 entitled "Air Filter Element With Radial Seal Sealing Element", the entire disclosures of which are incorporated by reference. The present invention relates to improvements in polymeric end caps.

BRIEF SUMMARY OF THE INVENTION

In one aspect, the invention provides an air filter element that comprises a tubular ring of pleated filter media, a first annular end cap, and a second composite end cap. The tubular ring of pleated filter media extends between first and second ends. The first annular end cap is located over the first end such that the first end is sealed. The second composite end cap comprises a foamed polymeric portion and a rigid urethane portion.

The foamed polymeric portion has a central aperture and stand-off apertures. The foamed polymeric portion is molded about the central aperture and the stand-off apertures such that the second end is sealed. Flashing occurs proximate an outer liner periphery. The rigid urethane portion is molded over the foamed urethane portion and fills the stand-off apertures such that the stand-off apertures are blocked.

In another aspect, the invention provides an air filter element that comprises an inner metal liner, an outer metal liner, a filter media, an annular end cap, and a composite end cap. The outer metal liner is concentrically spaced outside the inner metal liner and defines an outer liner periphery. The filter media is disposed between the inner and outer metal liners. The annular end cap is formed over the inner and outer metal liners such that the inner and outer metal liners are secured and at least a portion of the filter media is sealed. The composite end cap comprises a foamed urethane portion and a rigid urethane portion.

The foamed urethane portion has a central aperture and stand-off apertures. The foamed urethane portion is molded about the central aperture and the stand-off apertures such that the inner and outer metal liners are secured, at least a portion of the filter media is sealed, an annular groove is formed on an underside of the composite end cap, the annular groove having a plurality of transverse ribs therein, and urethane flashing occurs proximate one or more of the central aperture and the outer liner periphery. The rigid urethane portion is molded over the foamed urethane portion such that the stand-off apertures are blocked.

In a further aspect, the invention provides an air filtration system that comprises a housing, an air flow tube, and an air filter element. The air flow tube is securable to the housing. The air filter element comprises an inner metal liner, an outer metal liner, a filter media, an annular end cap, and a composite end cap. The outer metal liner is concentrically spaced outside the inner metal liner and defines an outer liner periphery. The filter media is disposed between the inner and outer metal liners. The annular end cap is formed over the inner and outer metal liners such that the inner and outer metal liners are secured and at least a portion of the filter media is sealed. The composite end cap comprises a foamed urethane portion and a rigid urethane portion.

The foamed urethane portion has a central aperture and stand-off apertures. The foamed urethane portion is molded about the central aperture and the stand-off apertures such that the inner and outer metal liners are secured, at least a portion of the filter media is sealed, and urethane flashing occurs proximate one or more of the central aperture and the outer liner periphery. The rigid urethane portion is molded over the foamed urethane portion such that the stand-off apertures are filled.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
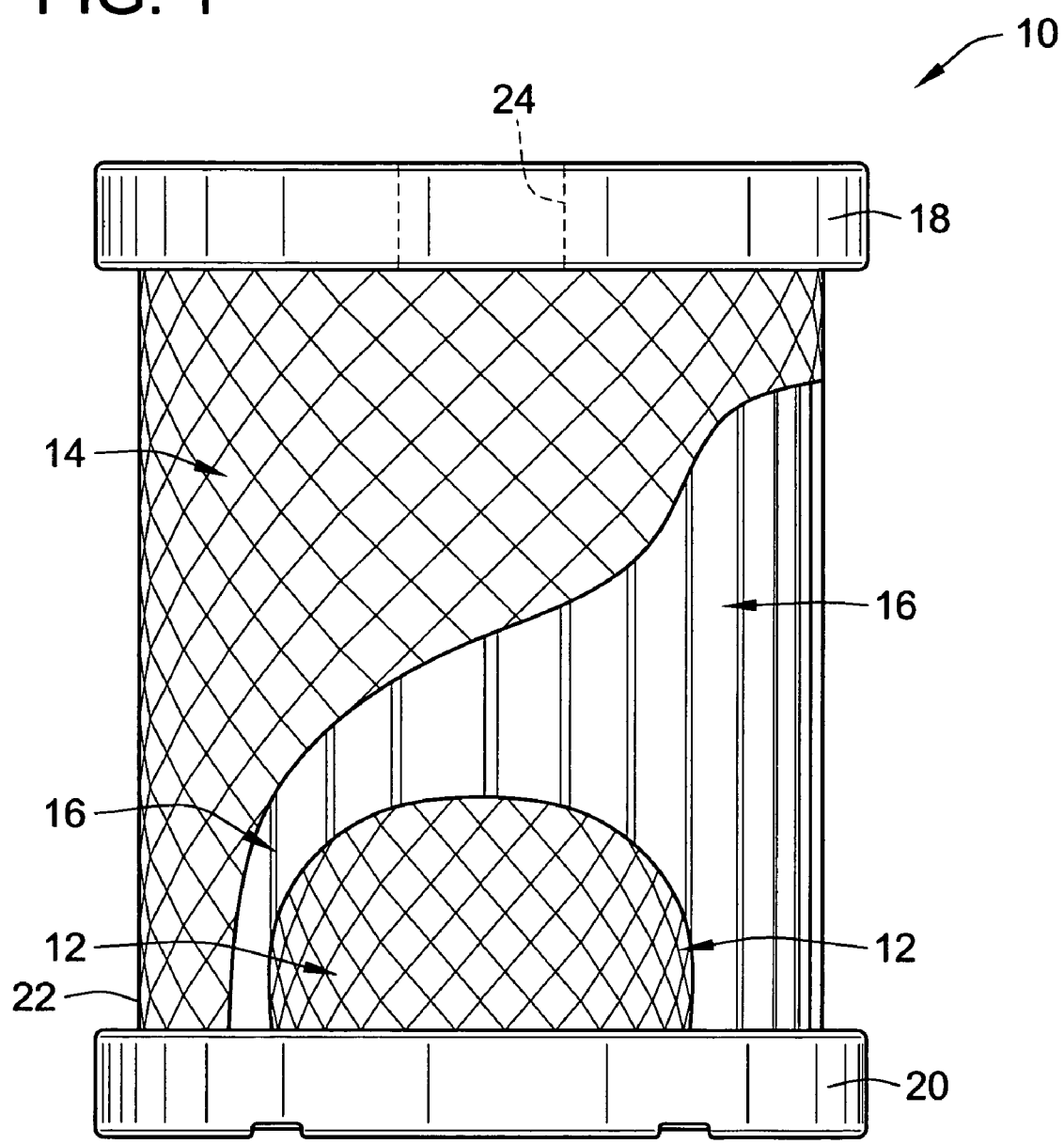
FIG. 1 is a side elevation view of an exemplary embodiment of an air filter element, including a cut-away portion, constructed in accordance with the teachings of the present invention.

Referring to FIG. 1, an air filter element 10 is illustrated. The air filter element 10 comprises an inner liner 12, an outer liner 14, a filter media 16, an annular end cap 18, and a composite end cap 20. As shown in the cutaway portion of FIG. 1, the outer liner 14 is concentrically spaced outside the inner liner 12 and the filter media 16 is disposed between the inner and outer liners 12, 14. The filter media 16 can be any of the conventional filter media as known in the art such as, for example, a cylindrical pleated cellulose filter media. Likewise, the inner and outer liners 12, 14, can be metal cylinders that are expanded, perforated, and the like, as known by those skilled in the art. The outer liner 14 defines an outer liner periphery 22.

The annular end cap 18 includes central aperture 24, as shown in FIG. 1, and is constructed of a flexible, compressible material such as, for example, a polymeric material, plastisol, non-foaming urethane, foaming urethane, and the like. In certain embodiments, the annular top end cap 18 can be a potted, pre-formed metal or plastic end cap carrying a gasket if deemed necessary. As such, the annular end cap 18 is able to secure in place the inner and outer liners 12, 14 as well as seal at least a portion of the filter media 16. The annular end cap 18 may be vertically disposed above the composite end cap 20 as oriented in FIG. 1.

Figure 2:
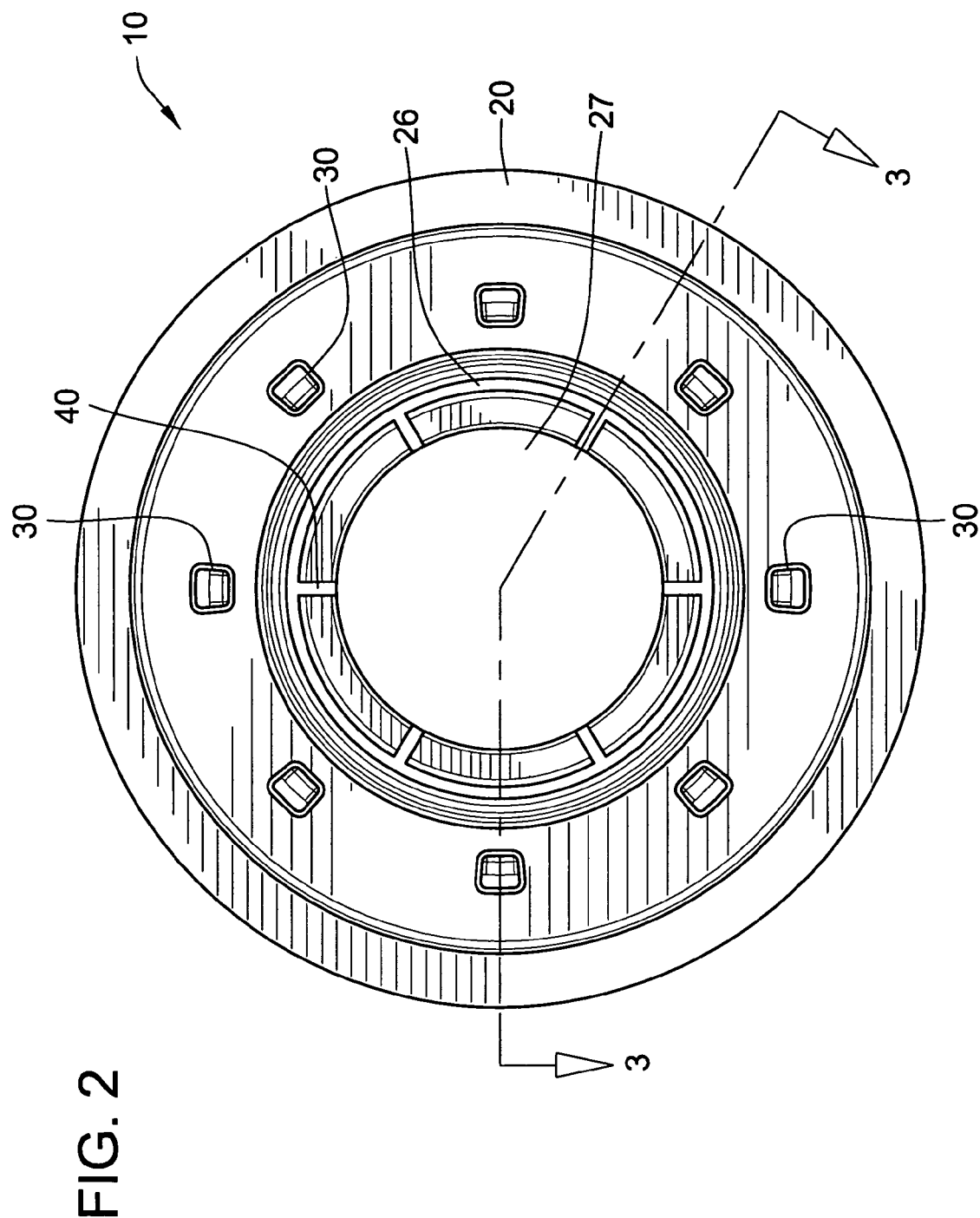
FIG. 2 is a bottom plan view of the air filter element of FIG. 1.
Figure 3:
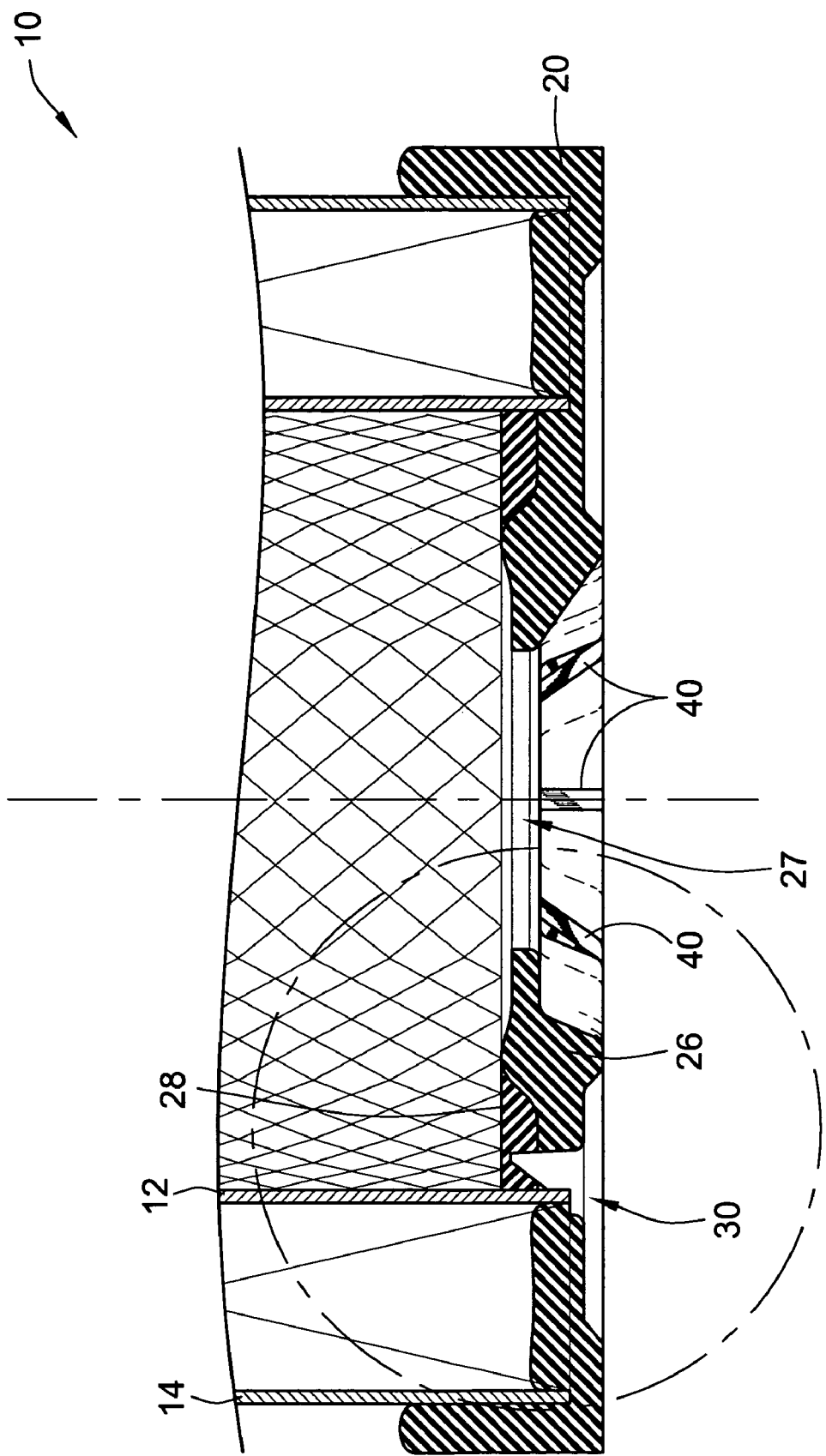
FIG. 3 is a fragmentary side cross-section view of the air filter element of FIG. 1 taken along line 3-3.

Referring to FIGS. 2-3, the composite end cap 20 comprises a foamed urethane portion 26 and a rigid urethane portion 28. The foamed urethane portion 26 is formed when a foaming urethane is introduced or flowed into a mold having a plurality of stand-offs therein. Guided by the mold, the foaming urethane flows over and around the inner and outer liners 12, 14, the filter media 16, and the stand-offs and forms a central aperture 27. When the foaming urethane hardens (i.e., cures), the inner and outer liners 12, 14, are secured within the composite end cap 20 and all or a portion of the filter media 16 proximate the end cap 20 is sealed.

As best shown in FIG. 2, when the air filter element 10 is extracted from the mold, a plurality of stand-off apertures 30 are left in the foamed urethane portion 26. A rigid urethane portion 28 is formed over the foamed urethane portion 26, as shown in FIG. 3, to fill, block, and/or seal these stand-off apertures 30. This rigid urethane portion 28, which is generally disposed over and around the foamed urethane portion 26, is used to cap the stand-off apertures 30. The rigid urethane that is used to construct the rigid urethane portion 28 experiences little or no expansion during curing (i.e., hardening) compared to the foaming urethane that is used to form the foamed urethane portion 26.

Figure 4:
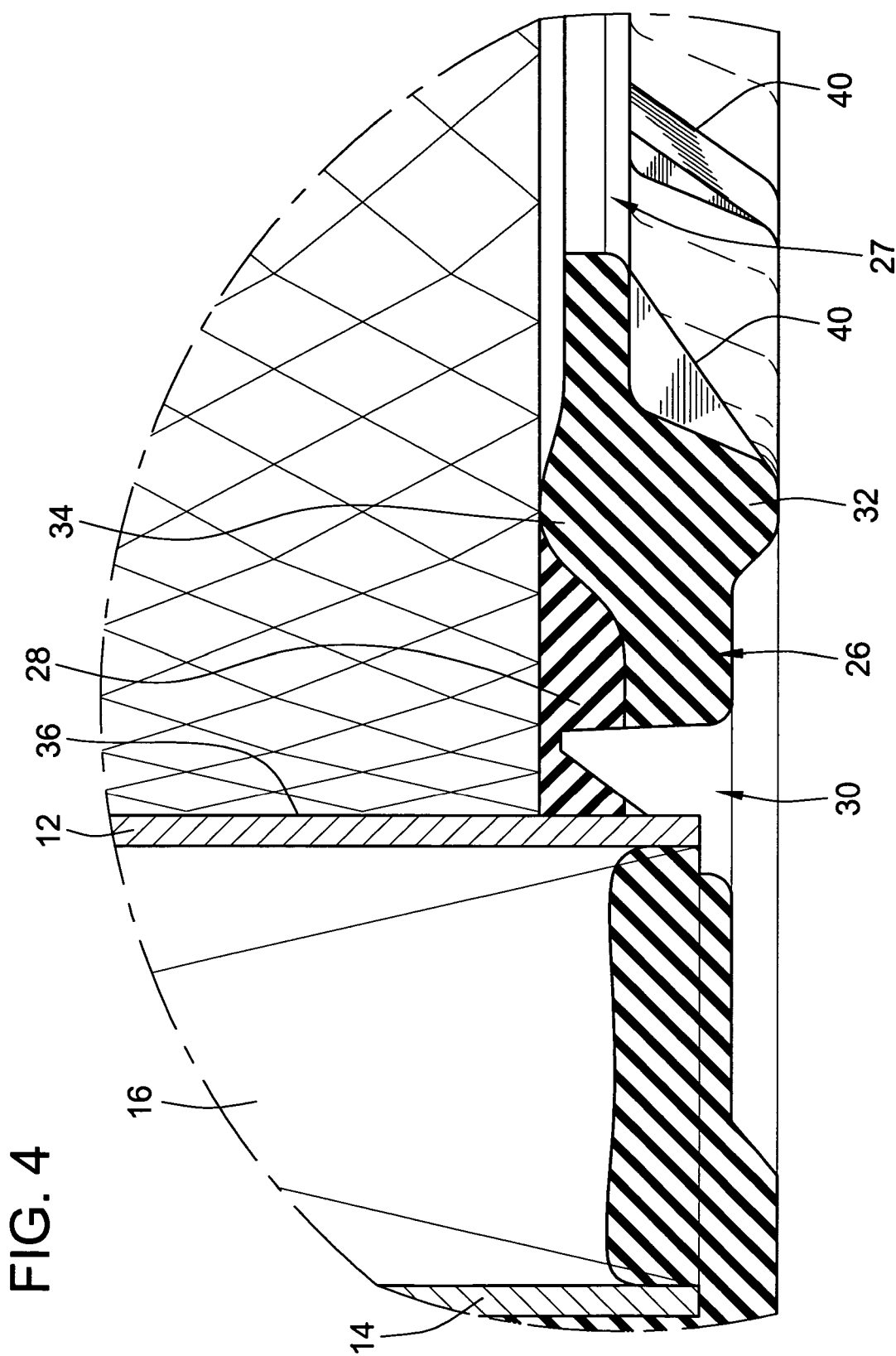
FIG. 4 is a fragmentary side cross section view of the air filter element of FIG. 1 highlighting a composite end cap.

In one embodiment, as depicted in detail in FIG. 4, the foamed urethane portion 26 includes a well portion 32. The well portion 32 results in the formation of a dam 34 that is vertically above the well portion 32 (as oriented in FIG. 4) when the foamed urethane portion 26 expands as it cures (i.e., hardens). The dam 34 is employed to provide a boundary for the rigid urethane portion 28.

Figure 6:
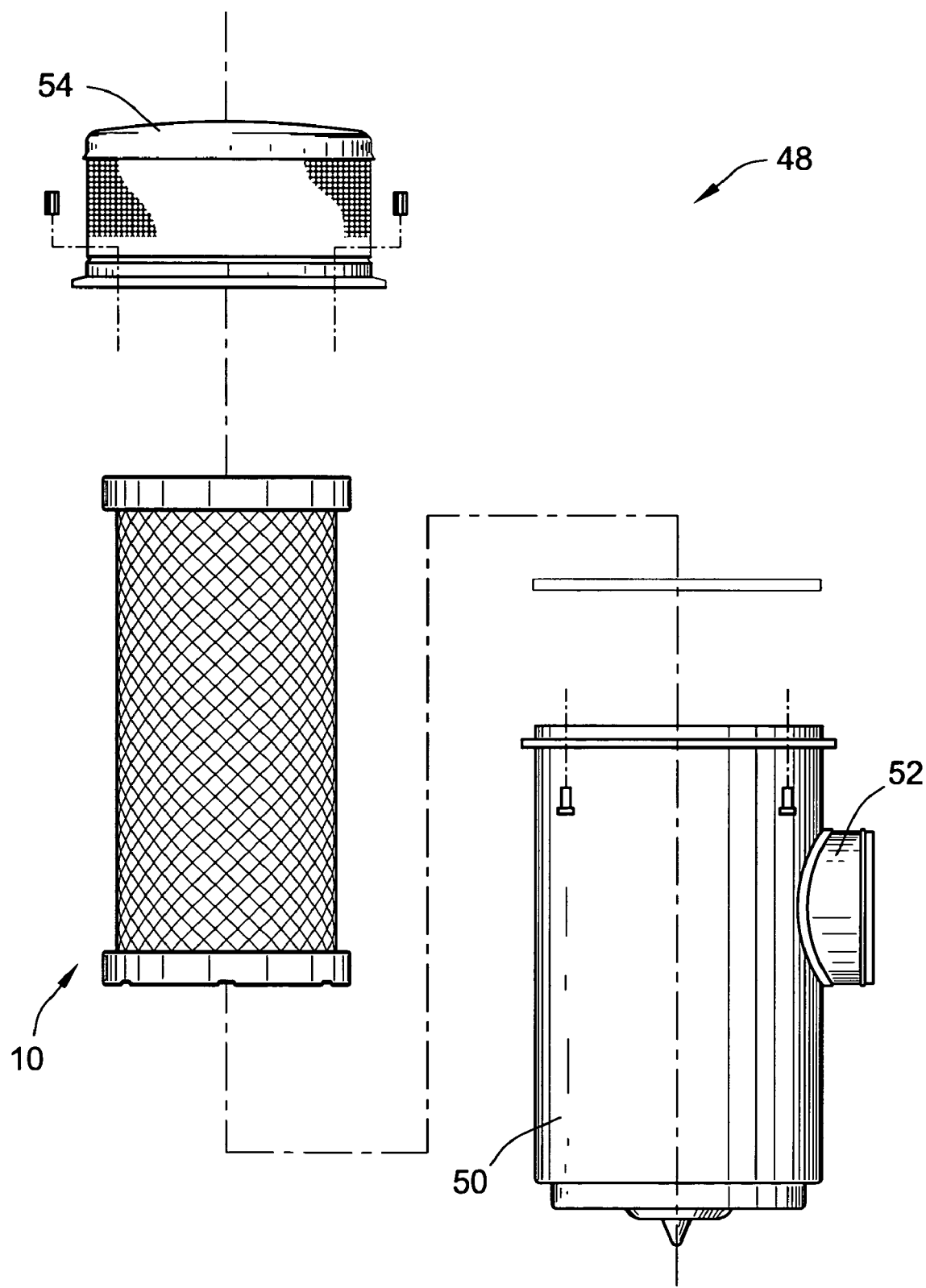
FIG. 6 is an exploded plan view of an air filtration system employing the air filter element of FIG. 1.

In a further preferred embodiment, as illustrated in FIG. 4, the foamed urethane portion 26 of the composite end cap 20 includes a plurality of transverse ribs 40. These transverse ribs 40 inhibit and/or prevent a seal from forming between the air filter element 10 and a corresponding annular internal rib within housing 50 (FIG. 6). Because the transverse ribs 40 inhibit and/or prevent the formation of a seal between the air filter element 10 and the housing 50, no negative pressure or vacuum is created in the housing and removal of the air filter element 10 from the housing is quick and easy.

Figure 5:
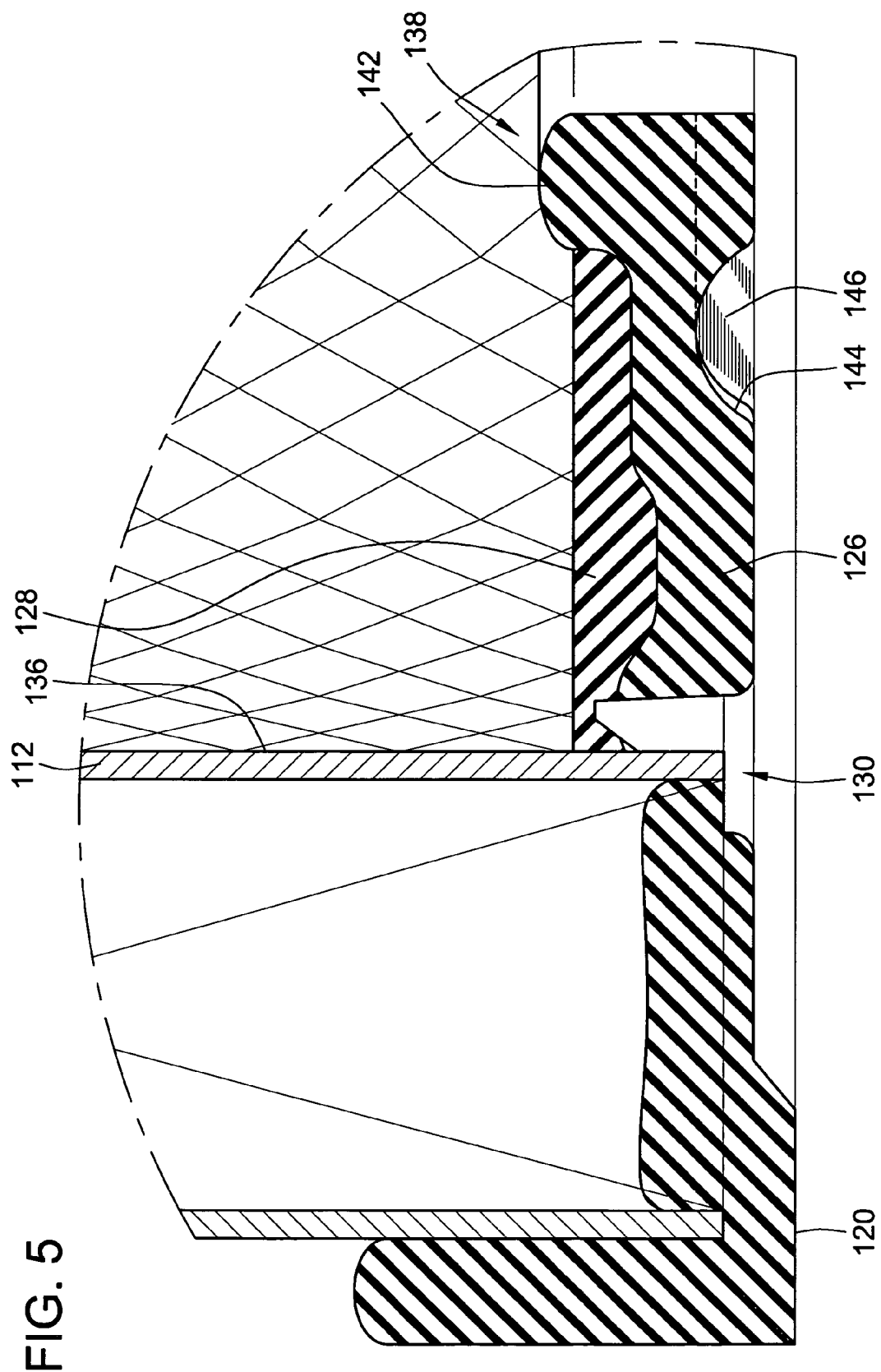
FIG. 5 is a fragmentary side cross section view of the air filter element of FIG. 1 highlighting another embodiment of the composite end cap.

In another embodiment, as illustrated in FIG. 5, a dam 142 is formed without the use of a well such as, for example, the well 32 of FIG. 4. However, like before, the dam 142 bounds the rigid urethane portion 128. Therefore, the rigid urethane portion 128 is positioned over the foamed urethane portion 126 and is disposed between the periphery 136 of the inner liner 112 and the dam 142 to seal and/or cap the stand-off apertures 130.

As illustrated in FIG. 5, when the foaming urethane is used to construct the foamed urethane portion 126, urethane "flashing" 138 occurs. Urethane flashing 138 is the result of the foaming urethane expanding as the foaming urethane cures (i.e., hardens). Because expansion of the foaming urethane is unpredictable, the flashing 138 generates an uneven and/or non-symmetrical outer periphery on the composite end cap 120.

Still referring to FIG. 5, in an exemplary embodiment, the foamed urethane portion 126 includes an annular groove 144 sized and dimensioned to engage with a corresponding portion on a housing 50 (FIG. 6). Again, in order to prevent a seal from forming between the air filter element 10 and the housing 50, a plurality of transverse ribs 146 are disposed within the annular groove 144.

In FIG. 6, an example of an air filtration system 48 is illustrated. As shown, the air filtration system 48 includes a housing 50, an air flow tube 52, a cover 54, and the air filter element 10. When the air filtration system 48 is assembled, the air filter element 10 is placed in the housing 50 and, thereafter, the cover 54 is secured to the housing. The transverse ribs 40, 146 (FIGS. 4 and 5) on the air filter element 10 inhibit and/or prevent a seal from forming between the air filter element and the housing 60.

When the filter is installed in the housing 50 and the cover 54 is tightened, axial and/or radial seals are formed by both the end caps 18, 20 to prevent short circuitry of air past the filter media 16. With the air filter element 10 in the housing 50, air flows in the cover 54 and passes through the air filter element 10 such that debris, contaminants, impurities, and the like are removed from the air supply. The air then flows through the air flow tube 52. Therefore, clean air can be provided to, for example, an internal combustion engine.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor(s) for carrying out the invention. Variations of those preferred embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all pos-

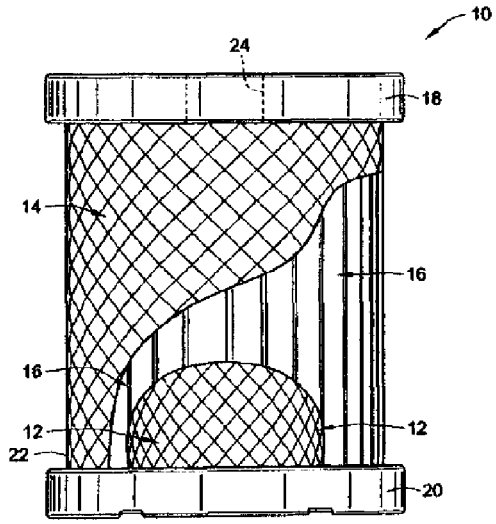

What is claimed is:

1. An air filter element comprising:
   a tubular ring of pleated filter media extending between first and second ends;
   a first annular end cap located over the first end such that the first end is sealed; and
   a second composite end cap comprising:
      a foamed polymeric portion having a central aperture and stand-off apertures, the foamed polymeric portion molded about the central aperture and the stand-off apertures such that the second end is sealed, and flashing occurring proximate an outer liner periphery; and
      a rigid urethane portion molded over the foamed polymeric portion and the stand-off apertures such that the stand-off apertures are blocked.

2. The filter element of claim 1, wherein the foamed polymeric portion includes a well portion disposed between the central aperture and the stand-off apertures.

3. The filter element of claim 2, wherein the well portion expands upwardly toward the annular end cap to form a dam portion.

4. The filter element of claim 3, wherein the dam portion provides a boundary for the rigid urethane portion disposed between an inner liner and the central aperture.

5. The air filter element of claim 1, wherein at least one of the stand-off apertures are filled and sealed by the rigid urethane portion.

6. The air filter element of claim 1, wherein the foamed polymeric portion has a constant diameter portion.

7. The air filter element of claim 1, wherein the foamed polymeric portion expands into pleats formed in the filter media.

8. The air filter element of claim 1, wherein the foamed polymeric portion expands into the filter media.

9. The air filter element of claim 1, wherein a plurality of ribs are disposed in the central aperture to inhibit and prevent a seal from forming between the filter element and a housing.

10. An air filter element comprising:
    an inner liner;
    an outer liner concentrically spaced outside the inner liner, the outer liner defining an outer liner periphery;
    a filter media disposed between the inner and outer liners, the filter media having a first end and a second end;
    an annular end cap formed over the inner and outer liners such that the inner and outer liners are secured and at least a portion of the first end of the filter media is sealed; and
    a composite end cap comprising:
       a foamed polymeric portion having a central aperture and stand-off apertures, the stand-off apertures surrounding the central aperture proximate an inner periphery of the filter media, the foamed polymeric portion molded about the central aperture and the stand-off apertures such that the inner and outer liners are secured, the second end of the filter media is sealed, an annular groove is formed on an underside of the composite end cap, the annular groove having a plurality of transverse ribs therein, and flashing occurs proximate one or more of the central aperture and the outer liner periphery; and
       a rigid urethane portion molded over the foamed polymeric portion such that the stand-off apertures are blocked.

11. The filter element of claim 10, wherein the foamed polymeric portion includes a well portion disposed between the central aperture and the stand-off apertures, the well portion expanding upwardly toward the annular end cap to form a dam portion.

12. The filter element of claim 11, wherein the dam portion provides a boundary for the rigid urethane portion disposed between an inner liner and the central aperture.

13. The filter element of claim 10, wherein the inner liner is adjacent to the stand-off apertures.

14. The air filter element of claim 10, wherein the foamed polymeric portion has a constant diameter portion.

15. The air filter element of claim 10, wherein the foamed polymeric portion expands into pleats formed in the filter media.

16. The air filter element of claim 10, wherein at least one of the stand-off apertures are filled and sealed by the rigid urethane portion.

17. An air filtration system comprising:
    a housing;
    an air flow tube securable to the housing; and
    an air filter element comprising:
       an inner liner;
       an outer liner concentrically spaced outside the inner liner, the outer liner defining an outer liner periphery;
       a filter media disposed between the inner and outer liners, the filter media having a first end and a second end;
       an annular end cap formed over the inner and outer liners such that the inner and outer liners are secured and at least a portion of the first end of the filter media is sealed; and
       a composite end cap comprising:
          a foamed polymeric portion having a central aperture and stand-off apertures, the foamed polymeric portion molded about the central aperture and the stand-off apertures such that the inner and outer liners are secured, the second end of the filter media is sealed, and polymeric flashing occurs proximate one or more of the central aperture and the outer liner periphery; and
          a rigid urethane portion molded over the foamed polymeric portion such that the stand-off apertures are filled.

18. The air filtration system of claim 17, wherein the foamed polymeric portion includes a well portion, the well portion expanding to form a dam portion as the foamed polymeric portion hardens.

19. The air filtration system of claim 18, wherein the dam portion is a boundary for the rigid urethane portion.

20. An air filter element comprising:
    a tubular ring of filter media extending between first and second ends;
    a first annular end cap located over the first end; and
    a second composite end cap comprising:
       a foamed polymeric portion having a central aperture, the foamed polymeric portion being molded such that the second end is sealed; and
       a rigid portion molded over the foamed polymeric portion.

21. A method for making a filter element comprising the steps of:
    providing a tubular ring of filter media extending between first and second ends;
    providing a first annular end cap located over the first end; and
    providing a second composite end cap comprising a foamed polymeric portion having a central aperture, the foamed polymeric portion being molded such that the second end is sealed; and a rigid portion molded over the foamed polymeric portion.

* * * * *

UNITED STATES PATENT AND TRADEMARK OFFICE
CERTIFICATE OF CORRECTION

| | | |
|---|---|---|
| PATENT NO. | : 7,815,705 B2 | Page 1 of 2 |
| APPLICATION NO. | : 11/254048 | |
| DATED | : October 19, 2010 | |
| INVENTOR(S) | : Brian T. Ehrenberg | |

It is certified that error appears in the above-identified patent and that said Letters Patent is hereby corrected as shown below:

Claim 21 should be deleted.

Col. 6, Line 55, insert the following claims:

21. The air filter element of claim 20, wherein the foamed polymeric portion having apertures.

22. The air filter element of claim 21, wherein the apertures are stand-off apertures.

23. The air filter element of claim 21, wherein the foamed polymeric portion includes a well portion disposed between the central aperture and the stand-off apertures.

24. The air filter element of claim 23, wherein the well portion expands upwardly toward the annular end cap to form a dam portion.

25. The air filter element of claim 24, wherein the dam portion provides a boundary for the rigid urethane portion disposed between an inside surface of the filter media and the central aperture.

26. The air filter element of claim 22, wherein at least one of the stand-off apertures are filled and sealed by the rigid portion.

Signed and Sealed this
Twenty-ninth Day of March, 2011

David J. Kappos
*Director of the United States Patent and Trademark Office*

27. The air filter element of claim 20, wherein the foamed polymeric portion has a constant diameter portion.

28. The air filter element of claim 20, wherein the foamed polymeric portion expands into pleats formed in the filter media.

29. The air filter element of claim 20, wherein the foamed polymeric portion expands into the filter media.

30. The air filter element of claim 20, wherein a plurality of ribs are disposed in the central aperture to inhibit and prevent a seal from forming between the filter element and a housing.

31. The air filter element of claim 20, wherein the foamed polymeric portion forms flashing proximate an outer surface of the filter media.

32. The air filter element of claim 20, further comprising an outer liner.

33. The air filter element of claim 20, further comprising an inner liner.

34. The air filter element of claim 20, wherein the first end is sealed.

UNITED STATES PATENT AND TRADEMARK OFFICE
CERTIFICATE OF CORRECTION

| | | |
|---|---|---|
| PATENT NO. | : 7,815,705 B2 | |
| APPLICATION NO. | : 11/254048 | |
| DATED | : October 19, 2010 | |
| INVENTOR(S) | : Brian T. Ehrenberg | |

It is certified that error appears in the above-identified patent and that said Letters Patent is hereby corrected as shown below:

Delete the title page and substitute therefor the attached title page showing the corrected number of claims in Patent.

Column 6, lines 55-65,
Claim 21 should be deleted.

Col. 6, Line 55, insert the following claims:

21. The air filter element of claim 20, wherein the foamed polymeric portion having apertures.

22. The air filter element of claim 21, wherein the apertures are stand-off apertures.

23. The air filter element of claim 21, wherein the foamed polymeric portion includes a well portion disposed between the central aperture and the stand-off apertures.

24. The air filter element of claim 23, wherein the well portion expands upwardly toward the annular end cap to form a dam portion.

This certificate supersedes the Certificate of Correction issued March 29, 2011.

Signed and Sealed this
Third Day of May, 2011

David J. Kappos
*Director of the United States Patent and Trademark Office*

25. The air filter element of claim 24, wherein the dam portion provides a boundary for the rigid urethane portion disposed between an inside surface of the filter media and the central aperture.

26. The air filter element of claim 22, wherein at least one of the stand-off apertures are filled and sealed by the rigid portion.

27. The air filter element of claim 20, wherein the foamed polymeric portion has a constant diameter portion.

28. The air filter element of claim 20, wherein the foamed polymeric portion expands into pleats formed in the filter media.

29. The air filter element of claim 20, wherein the foamed polymeric portion expands into the filter media.

30. The air filter element of claim 20, wherein a plurality of ribs are disposed in the central aperture to inhibit and prevent a seal from forming between the filter element and a housing.

31. The air filter element of claim 20, wherein the foamed polymeric portion forms flashing proximate an outer surface of the filter media.

32. The air filter element of claim 20, further comprising an outer liner.

33. The air filter element of claim 20, further comprising an inner liner.

34. The air filter element of claim 20, wherein the first end is sealed.

(12) United States Patent
Ehrenberg

(10) Patent No.: US 7,815,705 B2
(45) Date of Patent: Oct. 19, 2010

(54) AIR FILTER WITH COMPOSITE END CAP

(75) Inventor: Brian T. Ehrenberg, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 1151 days.

(21) Appl. No.: 11/254,048

(22) Filed: Oct. 19, 2005

(65) Prior Publication Data
US 2007/0084170 A1    Apr. 19, 2007

(51) Int. Cl.
*B01D 39/00* (2006.01)

(52) U.S. Cl. .................. 55/502; 55/498; 55/428; 55/510

(58) Field of Classification Search ............ 55/502, 55/498, 428, 423, 466, 476, 510; 95/273; 96/189; 264/267, 268
See application file for complete search history.

(56) References Cited

U.S. PATENT DOCUMENTS

| | | |
|---|---|---|
| 2,771,156 A | 11/1956 | Kasten et al. |
| 3,235,633 A | 2/1966 | Holloway et al. |
| 4,349,363 A | 9/1982 | Patel et al. |
| 4,720,292 A | 1/1988 | Engel et al. |
| 4,737,173 A * | 4/1988 | Kudirka et al. ............ 96/131 |
| 5,190,651 A | 3/1993 | Spencer et al. |
| 5,484,466 A | 1/1996 | Brown et al. |
| 5,613,992 A | 3/1997 | Engel |
| 5,690,712 A | 11/1997 | Engel |
| 5,730,766 A | 3/1998 | Clements |
| 5,897,676 A * | 4/1999 | Engel et al. ............ 55/498 |
| 5,938,804 A | 8/1999 | Engel et al. |
| 6,004,366 A | 12/1999 | Engel et al. |
| 6,258,145 B1 | 7/2001 | Engel et al. |
| 6,322,602 B2 | 11/2001 | Engel et al. |

(Continued)

FOREIGN PATENT DOCUMENTS

DE     195 21 898 A1    12/1996

(Continued)

OTHER PUBLICATIONS

U.S. Appl. No. 11/253,965, filed Oct. 19, 2005, Ehrenberg.

(Continued)

*Primary Examiner*—Michael A Marcheschi
*Assistant Examiner*—Karla Hawkins
(74) *Attorney, Agent, or Firm*—Leydig, Voit & Mayer, Ltd.

(57) ABSTRACT

The air filter element may include an inner metal liner, an outer metal liner, a filter media, an annular end cap, and a composite end cap. The annular end cap is formed over the metal liners such that the metal liners are secured and at least a portion of the filter media is sealed. The composite end cap has a foamed urethane portion and a rigid urethane portion. The foamed urethane portion, which has a central aperture and stand-off apertures, is molded about the central aperture and the stand-off apertures such that the metal liners are secured, at least a portion of the filter media is sealed, and urethane flashing occurs proximate one or more of the central aperture and an outer liner periphery. The rigid urethane portion is molded over the foamed urethane portion such that the stand-off apertures are filled, blocked, and/or sealed.

34 Claims, 6 Drawing Sheets